US012389156B2

(12) United States Patent
Grazian et al.

(10) Patent No.: US 12,389,156 B2
(45) Date of Patent: Aug. 12, 2025

(54) TRANSDUCER SURROUND HAVING A BAROMETRIC VENT

(71) Applicant: Apple Inc., Cupertino, CA (US)

(72) Inventors: Anthony P. Grazian, Mountain View, CA (US); Christopher Wilk, Los Gatos, CA (US); Onur I. Ilkorur, Santa Clara, CA (US); Catherine G. Waft, Sunnyvale, CA (US); Daniel W. Corona, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 18/464,747

(22) Filed: Sep. 11, 2023

(65) Prior Publication Data

US 2025/0088791 A1 Mar. 13, 2025

(51) Int. Cl.
*H04R 1/02* (2006.01)
*H04R 1/28* (2006.01)

(52) U.S. Cl.
CPC ........... *H04R 1/2826* (2013.01); *H04R 1/023* (2013.01); *H04R 1/025* (2013.01); *H04R 2400/11* (2013.01)

(58) Field of Classification Search
CPC ...... H04R 1/2826; H04R 1/023; H04R 1/025; H04R 2400/11
USPC .................................................... 381/87, 334
See application file for complete search history.

(56) References Cited

U.S. PATENT DOCUMENTS

| | | | | |
|---|---|---|---|---|
| 10,219,057 | B2 | 2/2019 | Luce et al. | |
| 2016/0173972 | A1 | 6/2016 | Moro | |
| 2022/0103934 | A1 | 3/2022 | Ilkorur et al. | |
| 2023/0217153 | A1 * | 7/2023 | Varanda ............... | H04R 1/2826 381/373 |

* cited by examiner

*Primary Examiner* — Ammar T Hamid
(74) *Attorney, Agent, or Firm* — Aikin & Gallant, LLP

(57) ABSTRACT

A transducer assembly comprising: a frame positioned within an interior chamber defined by an enclosure comprising a port to an ambient environment; a surround comprising a fixed portion sealed to the frame and a movable portion dividing the interior chamber into a front volume chamber coupling a first side of the surround to the port and a back volume chamber coupled to a second side of the surround; and a barometric vent coupled to the fixed portion to vent a pressure between the front volume chamber and the back volume chamber.

20 Claims, 3 Drawing Sheets

TRANSDUCER SURROUND HAVING A BAROMETRIC VENT

FIELD

An aspect of the disclosure is directed to a transducer surround having a barometric vent. Other aspects are also described and claimed.

BACKGROUND

Portable communications or listening devices (e.g., smart phones, earphones, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, or to output sound pressure waves corresponding to sounds associated with a game or music the user wishes to play. Due to the relatively low profile of the portable devices, the transducers also have a relatively low profile, which in turn, can make it difficult to maintain optimal sound quality.

SUMMARY

An aspect of the disclosure is directed to a device and/or transducer assembly having a barometric vent formed through the surround to reduce the device footprint required for the barometric vent and increase interior volumes for improved acoustic performance. Representatively, in some aspects, a barometric vent is used to equalize pressure between chambers within the transducer (e.g., front volume chamber and back volume chamber). To accommodate the barometric vent, the transducer enclosure or frame footprint is often increased to include an additional pocket or structure that forms an opening between the chambers and a membrane sealed over the opening to form the barometric vent. This increased footprint, however, may take away from an acoustic volume within the enclosure and reduce the size of the interior chambers (e.g., reducing the back volume chamber). This, in turn, may reduce the acoustic performance of the transducer. The instant disclosure, on the other hand, provides for a barometric vent through the surround so that an increase in the frame footprint is not necessary. Representatively, in one aspect, the surround may include a projecting portion sealed to the frame and the barometric vent may be stacked on top of the projecting portion. Since the barometric vent is stacked on top of the surround-to-frame seal a smaller footprint is achieved. The smaller footprint means that there is more volume and X-Y space for other features, such as additional back volume, or additional space for a harp mesh, which provides low frequency performance benefits.

Representatively, in some aspects, the disclosure is directed to a transducer assembly comprising: a frame positioned within an interior chamber defined by an enclosure comprising a port to an ambient environment; a surround comprising a fixed portion sealed to the frame and a movable portion dividing the interior chamber into a front volume chamber coupling a first side of the surround to the port and a back volume chamber coupled to a second side of the surround; and a barometric vent coupled to the fixed portion to vent a pressure between the front volume chamber and the back volume chamber. In some aspects, the fixed portion may include a projection extending radially outward from the movable portion and the barometric vent is coupled to the projection. The movable portion may include a rectangular shape and the projection extends radially outward from a corner of the rectangular shape. In other aspects, the movable portion may include a hexagonal shape and the projection extends radially outward from a side of the hexagonal shape. The projection may extend radially outward from less than an entire perimeter of the movable portion. In some aspects, the barometric vent may include an air permeable membrane covering an opening through the fixed portion of the surround and the frame, and a perimeter of the air permeable membrane is sealed to the fixed portion. In some aspects, the perimeter of the air permeable membrane is sealed to a top side of the fixed portion of the surround, and a bottom side of the fixed portion of the surround directly below the perimeter is sealed to the frame. In some aspects, the barometric vent includes a triangular shape, a rectangular shape, a square shape, an elliptical shape or a racetrack shape. In still further aspects, the movable portion may include a rolled portion that surrounds a piston portion that is operable to vibrate to generate sound. In other aspects, the movable portion is symmetrical about two axes.

In still further aspects, a portable electronic device is disclosed including an enclosure having a top cover and a bottom cover that define an interior chamber and an acoustic port to the interior chamber; a frame positioned within the interior chamber and sealed to the top cover or the bottom cover; a surround comprising a perimeter portion sealed to the frame and a movable portion operable to generate sound that divides the interior chamber into a front volume chamber coupling a first side of the movable portion to the acoustic port and a back volume chamber coupled to a second side of the movable portion; and a barometric vent comprising an air permeable membrane sealed to the perimeter portion to vent a pressure between the front volume chamber and the back volume chamber. In some aspects, the perimeter portion includes a projection extending radially outward from the movable portion and the barometric vent is coupled to the projection. In still further aspects, the movable portion includes a rectangular shape and the projection extends radially outward from a corner of the rectangular shape. In other aspects, the movable portion may include a hexagonal shape and the projection extends radially outward from a side of the hexagonal shape. The projection may extend radially outward from less than an entire perimeter of the movable portion. In some aspects, the barometric vent includes an air permeable membrane covering an opening through the perimeter portion of the surround and the frame, and a perimeter of the air permeable membrane is sealed to the perimeter portion. In some aspects, the perimeter of the air permeable membrane is sealed to a top side of the perimeter portion of the surround, and a bottom side of the fixed portion of the surround directly below the perimeter of the surround is sealed to the frame. In some aspects, the barometric vent includes triangular shape. In still further aspects, the movable portion comprises a rolled portion that surrounds a piston portion that is operable to vibrate to generate sound. The movable portion may further be symmetrical about two axes.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
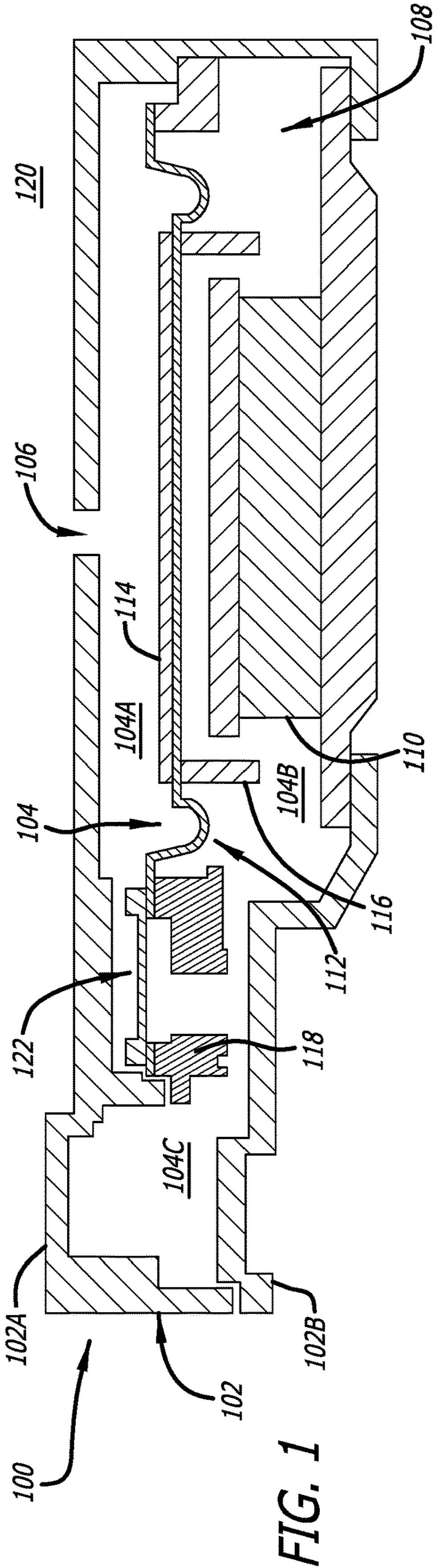
FIG. 1 illustrates a cross-sectional side view of one aspect of a portable electronic device and/or transducer assembly having a barometric vent.

FIG. 1 illustrates a cross-sectional side view of one aspect of a transducer assembly that may be integrated into a portable electronic device. Assembly 100 may include a housing, casing or outer enclosure 102 that defines or closes off a chamber in which the constituent electronic components of assembly 100 are contained. In some aspects, it is contemplated that assembly 100 may be a transducer module or a portable or mobile communications device within which the module is integrated, an in-ear device, portable time piece or any other device within which a transducer may be implemented. In some aspects, enclosure 102 may include a top cover 102A coupled to a bottom cover 102B that separate a surrounding environment from an encased space or interior chamber 104 formed within enclosure 102. In some cases, enclosure 102 completely isolates or seals the entire, or a portion of, interior chamber 104 from the surrounding environment. For example, enclosure 102 may form a waterproof or acoustically isolated portion of interior chamber 104 which is impermeable to water and/or air. The interior chamber 104 may be of a sufficient volume and/or size to accommodate the constituent components of assembly 100. In some aspects, enclosure 102 may also include one or more of an acoustic port 106. The acoustic port 106 may be, for example, a sound output port through which sound from a transducer such as a speaker positioned within interior chamber 104 may be output. In other aspects, where a microphone is positioned near enclosure acoustic port 106, it could be a sound input port to allow for input of sound to the microphone.

Representatively, in one aspect shown in FIG. 1, enclosure acoustic port 106 is an acoustic port that is acoustically open to a transducer 108 positioned within interior chamber 104. In some aspects, transducer 108 may be any type of electroacoustic transducer capable of converting an electrical audio signal into a sound or a sound into an electrical audio signal. Representatively, transducer 108 may be a speaker or a micro-speaker, for example, a miniaturized version of a loudspeaker that uses a moving coil motor to drive sound output. For example, transducer 108 may include a magnet assembly 110 mounted to bottom cover 102B. A surround 112 having a stiffener 114 coupled to a top side and a voice coil 116 coupled to a bottom side may be positioned over magnet assembly 110. A perimeter of surround 112 may be sealed to frame 118 and the remainder of surround 112 may be movable such that the stiffener 114 and voice coil 116 may vibrate relative to magnet assembly 110 and output sound. Thus, in some aspects, transducer 108 may be referred to herein as a micro-speaker. In other aspects, where transducer 108 converts sound into an electrical audio signal, it may further be referred to herein as a microphone.

In some aspects, surround 112 may further be considered to divide interior chamber 104 into a front volume chamber 104A and a back volume chamber 104B around transducer 108. In the case where transducer 108 is a speaker, front volume chamber 104A may form a chamber having a first volume around the sound output face or top side of surround 112. The front volume chamber 104A (and first volume) may be considered acoustically coupled to, or otherwise open to, acoustic port 106. In this aspect, sound pressure waves output from the top side of surround 112 of transducer 108 may pass through front volume chamber 104A and out to the surrounding ambient environment 120 through acoustic port 106. Back volume chamber 104B may have a second volume and surround the back side of surround 112. Typically, the front volume chamber 104A is substantially sealed from the back volume chamber 104B. It is recognized, however, that in some aspects a size, volume, pressure or other aspects of front volume chamber 104A and/or back volume chamber 104B may impact the acoustic performance of transducer 108. Thus, modifying the size, volume and/or pressure of front volume chamber 104A and/or back volume chamber 104B may be used to tune the acoustic performance of transducer 108. For example, in some cases, it may be desirable to increase a size of the back volume chamber 104B while also equalizing a pressure between front volume chamber 104A and back volume chamber 104B.

With this in mind, a barometric vent 122 between the front and back volume chambers 104A-B may further be provided to help equalize the pressure between the two chambers. In addition, barometric vent 122 may have a particular arrangement and/or configuration that also increases a size of back volume chamber 104B. For example, it is contemplated that in some aspects, barometric vent 122 may be arranged within a footprint of surround 112 and frame 118, instead of outside of surround/frame, such that the additional volume 104C may be part of back volume 104B resulting in an increased back volume. For example, in some aspects, additional volume 104C may be a volume including an acoustically adsorbent material such as a zeolite which may increase low frequency performance when coupled to the back volume 104B.

Figure 2:
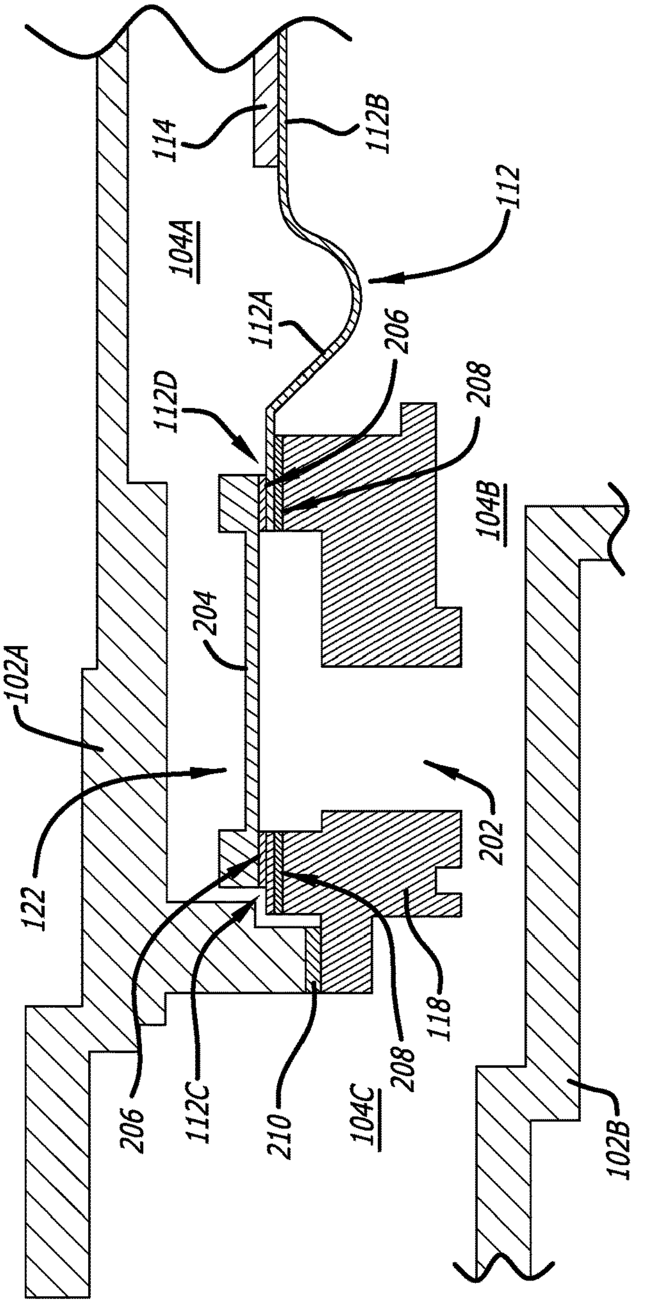
FIG. 2 illustrates a magnified cross-sectional side view of a portion of the barometric vent of the portable electronic device and/or transducer assembly of FIG. 1.

Representatively, barometric vent 122 will now be described in more detail in reference to FIG. 2. FIG. 2 illustrates a magnified view of barometric vent 122 of FIG. 1. From this view, it can be understood that surround 112 includes a movable portion 112B having a stiffener 114 attached thereto that moves or vibrates up and down to output sound as previously discussed. A rolled portion 112A is further positioned radially outward from, or otherwise around, the movable portion 112B to allow for the vibration or up/down movement of movable portion 112B. As can be seen from this view, rolled portion 112A has a curved or otherwise out-of-plane shape that allows the movable portion 112B to move up/down in a piston like fashion relative to frame 118. Extending from rolled portion 112A is a perimeter portion 112D of surround 112 that is sealed to a top surface of frame 118 by a frame seal 208 (e.g., a glue or other sealing material). Perimeter portion 112D may therefore be understood as a fixed portion of surround 112 that connects and suspends surround 112 from frame 118. Perimeter portion 112D may extend entirely around rolled portion 112A. Extending laterally outward from perimeter portion 112D is a protrusion or extension portion 112C, which is also sealed to frame 118 and includes barometric vent 122. In this aspect, protrusion or extension portion 112C and frame 118 include an opening 202 that provides a vent or pathway between front volume 104A and back volume 104B. An air permeable and water-proof membrane 204 is then positioned over opening 202 and sealed to the top side of perimeter portion 112D of surround 112.

Representatively, in some aspects, membrane 204 may be sealed to a top side of surround perimeter portion 112D using a surround seal 206 (e.g., a glue or other sealing material) that is considered stacked directly above the frame seal 208 along the bottom side of surround portion 112D. Membrane 204 may allow for the passage of air to equalize the pressure between front and back volumes 104A and 104B, while preventing the passage of water between the volumes. Barometric vent 122 may be considered formed by a stack up of frame 118, frame seal 208 sealing surround protrusion 112C to frame 118, and surround seal 206 sealing membrane 204 to surround protrusion 112C. In this aspect, barometric vent 122 may be considered to be within a footprint of frame 118 and does not require or otherwise occupy additional space within front and/or rear volumes 104A-B. Frame 210 may then be sealed to top cover 202A by a further sealing layer 210 (e.g., a glue or other sealing material). It should further be understood that the various sealing layers 206, 208, 210 may extend entirely around the associated components to seal them together and prevent passage of air and/or water therethrough. It should further be understood that surround 112 is a single integrally formed structure including each of the portions 112A-D as previously discussed. In addition, protrusion or extension portion 112C may be understood as extending from only a portion of perimeter portion 112D. In other words, protrusion or extension portion 112C does not extend entirely around protrusion or extension portion 112C.

Figure 3:
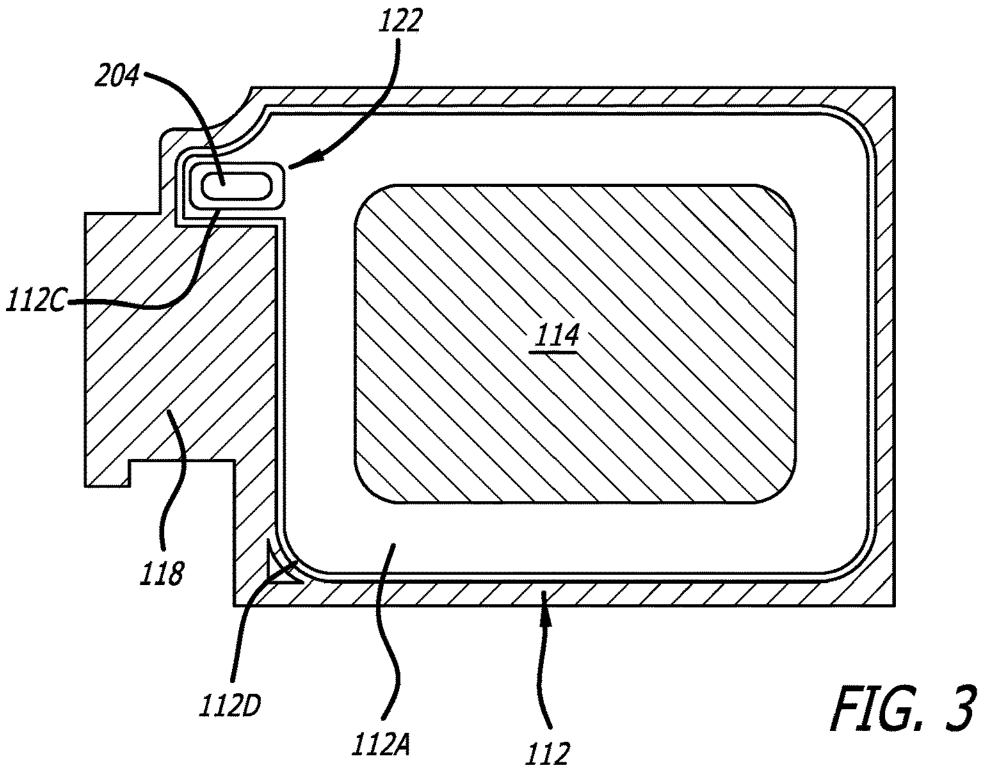
FIG. 3 illustrates a top view of one representative configuration of the barometric vent of the portable electronic device and/or transducer assembly of FIG. 1.

Representatively, referring now in more detail to surround 112, as can be seen from FIG. 3, in some aspects, surround 112 may have a substantially rectangular shape with the protrusion or extension portion 112C extending from only a corner of the rectangular shape. For example, stiffener 114 may be attached to the center movable portion of surround 112 as previously discussed and have a rectangular shape. The rolled portion 112A extends radially outward from, and entirely around, the center movable portion and stiffener 114. Rolled portion 112A may further be considered to have a substantially rectangular shape (e.g., with rounded corners). Perimeter portion 112D then extends radially outward from and around rolled portion 112A, and is attached to frame 118 to suspend surround 112 over the previously discussed vent opening 202 formed through frame 118. Protrusion portion 112C then extends radially outward from one of the corners of surround 112 as shown. Barometric vent 122 is formed through protrusion portion 112C. Representatively, vent opening 202 is formed through protrusion portion 112C and the portion of frame 118 underlying this protrusion portion 112C. Membrane 204 is then positioned over opening 202 and sealed around opening 202 to protrusion portion 112C. As illustrated by this configuration, in some aspects, the opening and/or membrane 204 may have an elongated, elliptical, racetrack like and/or rectangular shape. In this aspect, barometric vent 122 is considered within a footprint of frame 118 such that the remaining volumes and spaces of enclosure can be used to form the back and/or front volume chambers 104A-B as previously discussed. In addition, it should further be understood that while protrusion portion 112C is shown extending from a corner of surround 112, protrusion portion 112C may extend from another portion of the perimeter of surround 112. The most important aspect is that protrusion portion 112C be within the sealed perimeter portion 112D and near the rolled portion 112A of surround 112 such that it remains within a footprint of frame 118 so that barometric vent 112 does not occupy additional frame space that could otherwise be used for the back or front volume chambers. For example, in some aspects, protrusion portion 112C could extend laterally outward from a side of surround 112 such that barometric vent 122 is formed along a side of surround 112.

Figure 4:
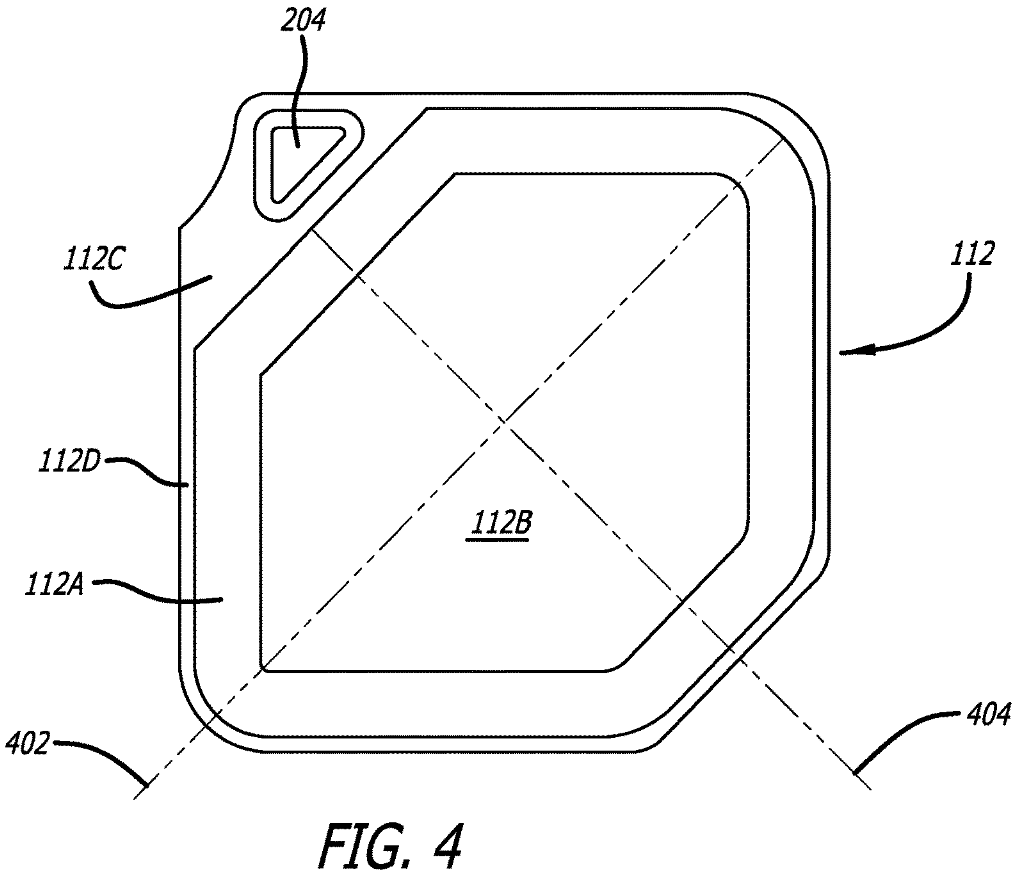
FIG. 4 illustrates a top view of another representative configuration of the barometric vent of the portable electronic device and/or transducer assembly of FIG. 1.

FIG. 4 illustrates a top plan view of another representative surround configuration. Similar to the previously discussed surround 112 configurations, surround 112 may have a movable portion 112B surrounded by a rolled portion 112A and a perimeter portion 112D sealed to the underlying frame 118. In this configuration, however, the movable surround portions 112A and 112B define a substantially hexagonal or six-sided surround shape. The movable surround portions 112A and 112B may further be understood as defining a shape that is symmetrical about two axes 402, 404. It is noted that the movable portion of surround 112 should be symmetrical about two axes 402, 404 so that the movement is a pistonic like motion up and down and parallel to a vertical axis with little to no rocking and/or rolling. In addition, in this configuration, the extension or protrusion portion 112C may extend from a side instead of a corner of the hexagonal shaped surround 112. For example, extension or protrusion portion 112C may have an almost triangular shape and barometric vent 204 may be a triangular shaped vent formed through portion 112C as shown. It should be understood, however, that barometric vent 204 may have any shape and/or size so long as it remains within the footprint of frame 118 and surround 112 as discussed, and provides the desired pressure equalization between front and back volumes 104A-B. For example, barometric vent 204 could have a rectangular, square, triangular, elliptical, a racetrack, or any other shape as desired.

Figure 5:
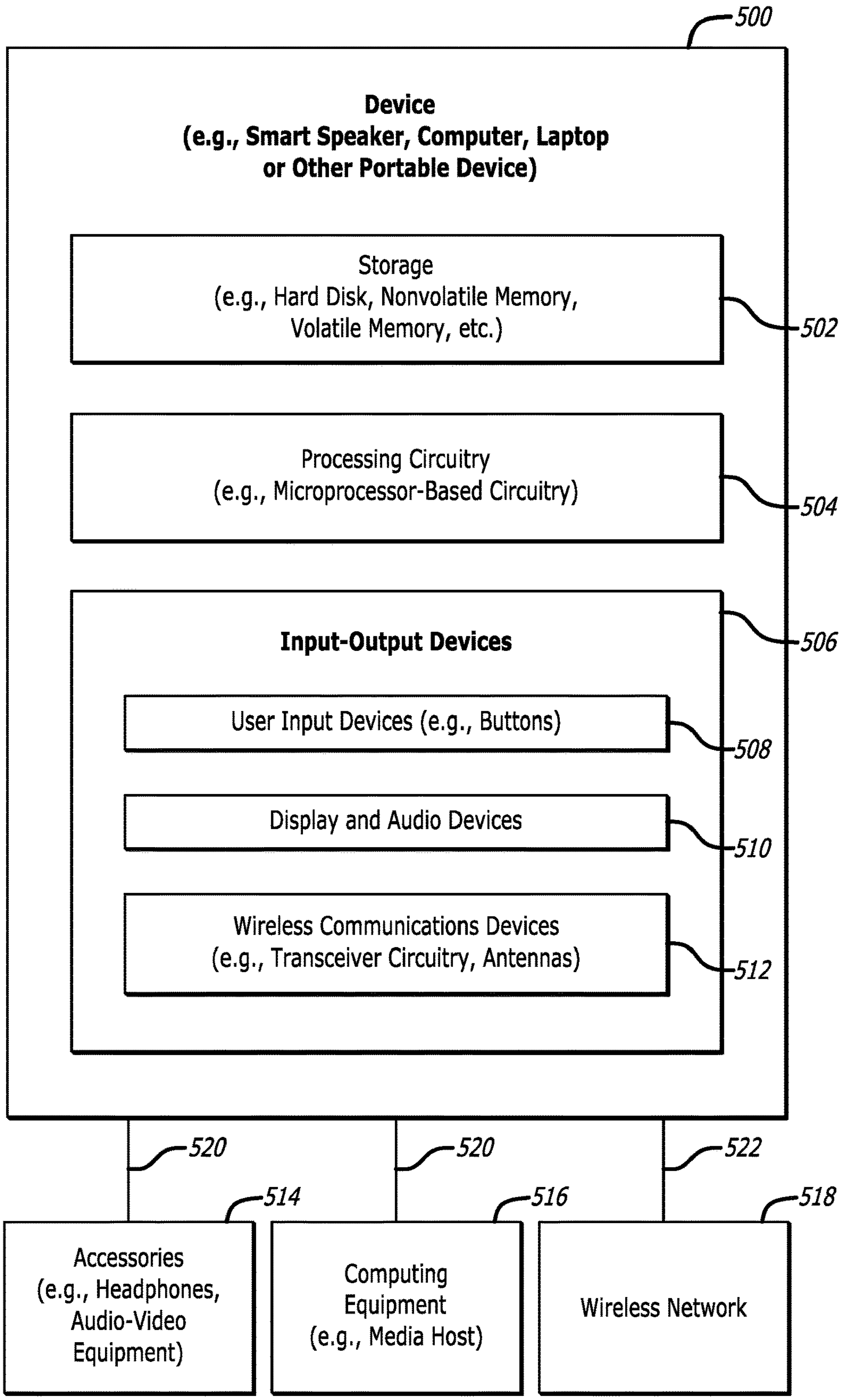
FIG. 5 illustrates a block diagram of one aspect of a portable electronic device within which a transducer assembly of FIG. 1-FIG. 4 may be implemented.

FIG. 5 illustrates a block diagram of one aspect of an electronic device within which the previously discussed transducer including a barometric vent may be implemented. As shown in FIG. 5, device 500 may be any type of portable device within which a transducer and/or vent disclosed herein may be desired, for example, an earpiece (e.g., in-ear earpiece, hearing aid or the like), mobile phone, personal digital assistant, portable timepiece or other portable device. Device 500 may include storage 502. Storage 502 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 504 may be used to control the operation of device 500. Processing circuitry 504 may be based on a processor such as a microprocessor and other suitable integrated circuits. With one suitable arrangement, processing circuitry 504 and storage 502 are used to run software on device 500, such as internet browsing applications, voice-over-internet-protocol (VOIP) telephone call applications, email applications, media playback applications, operating system functions, etc. Processing circuitry 504 and storage 502 may be used in implementing suitable communications protocols. Communications protocols that may be implemented using processing circuitry 504 and storage 502 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 504 may include power management circuitry to implement power management functions. For example, processing circuitry 504 may be used to adjust the gain settings of amplifiers (e.g., radio-frequency power amplifier circuitry) on device 500. Processing circuitry 504 may also be used to adjust the power supply voltages that are provided to portions of the circuitry on device 500. For example, higher direct-current (DC) power supply voltages may be supplied to active circuits and lower DC power supply voltages may be supplied to circuits that are less active or that are inactive. If desired, processing circuitry 504 may be used to implement a control scheme in which the power amplifier circuitry is adjusted to accommodate transmission power level requests received from a wireless network.

Input-output devices 506 may be used to allow data to be supplied to device 500 and to allow data to be provided from device 500 to external devices. Display screens, microphone acoustic ports, speaker acoustic ports, and docking ports are examples of input-output devices 506. For example, input-output devices 506 can include user input-output devices 508 such as buttons, touch screens, joysticks, click wheels, scrolling wheels, touch pads, keypads, keyboards, microphones, cameras, etc. A user can control the operation of device 500 by supplying commands through user input devices 508. Display and audio devices 510 may include liquid-crystal display (LCD) screens or other screens, light-emitting diodes (LEDs), and other components that present visual information and status data. Display and audio devices 510 may also include audio equipment such as speakers and other devices for creating sound. Display and audio devices 510 may contain audio-video interface equipment such as jacks and other connectors for external headphones and monitors.

Wireless communications devices 512 may include communications circuitry such as radiofrequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 5, device 500 can communicate with external devices such as accessories 514, computing equipment 516, and wireless network 518 as shown by paths 520 and 522. Paths 520 may include wired and wireless paths. Path 522 may be a wireless path. Accessories 514 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 516 may be any suitable computer. With one suitable arrangement, computing equipment 516 is a computer that has an associated wireless access point (router) or an internal or external wireless card that establishes a wireless connection with device 500. The computer may be a server (e.g., an internet server), a local area network computer with or without internet access, a user's own personal computer, a peer device (e.g., another portable electronic device), or any other suitable computing equipment.

Wireless network 518 may include any suitable network equipment, such as cellular telephone base stations, cellular towers, wireless data networks, computers associated with wireless networks, etc. For example, wireless network 518 may include network management equipment that monitors the wireless signal strength of the wireless handsets (cellular telephones, handheld computing devices, etc.) that are in communication with network 518.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although a speaker is specifically disclosed herein, the vent disclosed herein could be used with other types of transducers, for example, microphones. Still further, although a portable electronic device such as a mobile communications device is described herein, any of the previously discussed valve and transducer configurations may be implemented within a tablet computer, personal computer, laptop computer, notebook computer, headphones and the like. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A transducer assembly comprising:

a frame positioned within an interior chamber defined by an enclosure comprising a port to an ambient environment;

a surround comprising a fixed portion sealed to the frame and a movable portion dividing the interior chamber into a front volume chamber coupling a first side of the surround to the port and a back volume chamber coupled to a second side of the surround; and a barometric vent coupled to the fixed portion to vent a pressure between the front volume chamber and the back volume chamber.

2. The transducer assembly of claim 1 wherein the fixed portion comprises a projection extending radially outward from the movable portion and the barometric vent is coupled to the projection.

3. The transducer assembly of claim 2 wherein the movable portion comprises a rectangular shape and the projection extends radially outward from a corner of the rectangular shape.

4. The transducer assembly of claim 2 wherein the movable portion comprises a hexagonal shape and the projection extends radially outward from a side of the hexagonal shape.

5. The transducer assembly of claim 2 wherein the projection extends radially outward from less than an entire perimeter of the movable portion.

6. The transducer assembly of claim 1 wherein the barometric vent comprises an air permeable membrane covering an opening through the fixed portion of the surround and the frame, and a perimeter of the air permeable membrane is sealed to the fixed portion.

7. The transducer assembly of claim 6 wherein the perimeter of the air permeable membrane is sealed to a top side of the fixed portion of the surround, and a bottom side of the fixed portion of the surround directly below the perimeter is sealed to the frame.

8. The transducer assembly of claim 1 wherein the barometric vent comprises a triangular shape, a rectangular shape, a square shape, an elliptical shape or a racetrack shape.

9. The transducer assembly of claim 1 wherein the movable portion comprises a rolled portion that surrounds a piston portion that is operable to vibrate to generate sound.

10. The transducer assembly of claim 1 wherein the movable portion is symmetrical about two axes.

11. A portable electronic device comprising:

an enclosure having a top cover and a bottom cover that define an interior chamber and an acoustic port to the interior chamber;

a frame positioned within the interior chamber and sealed to the top cover or the bottom cover;

a surround comprising a perimeter portion sealed to the frame and a movable portion operable to generate sound that divides the interior chamber into a front volume chamber coupling a first side of the movable portion to the acoustic port and a back volume chamber coupled to a second side of the movable portion; and a barometric vent comprising an air permeable membrane sealed to the perimeter portion to vent a pressure between the front volume chamber and the back volume chamber.

12. The portable electronic device of claim 11 wherein the perimeter portion comprises a projection extending radially outward from the movable portion and the barometric vent is coupled to the projection.

13. The portable electronic device of claim 12 wherein the movable portion comprises a rectangular shape and the projection extends radially outward from a corner of the rectangular shape.

14. The portable electronic device of claim 12 wherein the movable portion comprises a hexagonal shape and the projection extends radially outward from a side of the hexagonal shape.

15. The portable electronic device of claim 12 wherein the projection extends radially outward from less than an entire perimeter of the movable portion.

16. The portable electronic device of claim 11 wherein the barometric vent comprises an air permeable membrane covering an opening through the perimeter portion of the surround and the frame, and a perimeter of the air permeable membrane is sealed to the perimeter portion of the surround.

17. The portable electronic device of claim 16 wherein the perimeter of the air permeable membrane is sealed to a top side of the perimeter portion of the surround, and a bottom side of the perimeter portion of the surround directly below the perimeter of the air permeable membrane is sealed to the frame.

18. The portable electronic device of claim 11 wherein the barometric vent comprises a triangular shape, a rectangular shape, a square shape, an elliptical shape or a racetrack shape.

19. The portable electronic device of claim 11 wherein the movable portion comprises a rolled portion that surrounds a piston portion that is operable to vibrate to generate sound.

20. The portable electronic device of claim 11 wherein the movable portion is symmetrical about two axes.

* * * * *